July 17, 1956 R. M. M. OBERMAN 2,755,340

CIRCUIT RESERVING SYSTEM

Filed Jan. 8, 1952

INVENTOR.
ROELOF MAARTEN MARIE OBERMAN
BY Hugh A Kirk

United States Patent Office 2,755,340

Patented July 17, 1956

2,755,340

CIRCUIT RESERVING SYSTEM

Roelof Maarten Marie Oberman, The Hague, Netherlands, assignor to De Staat der Nederlanden, Ten Deze Vertegenwoordigd Door de Directeur-Generaal der Posterijen Telegrafie en Telefonie, The Hague, Netherlands Application January 8, 1952, Serial No. 265,456

15 Claims. (Cl. 179—18)

Figure 1:
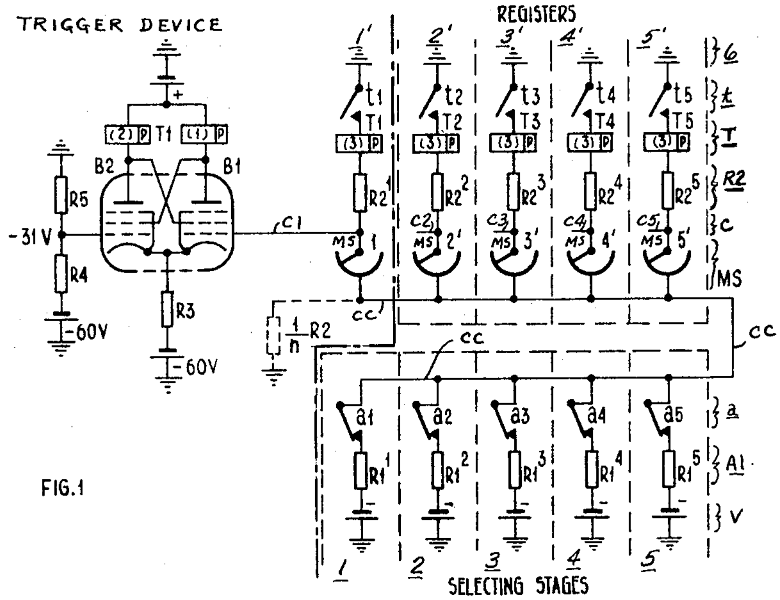

This invention relates to an arrangement for reserving selectors, lines, links, etc. in automatic signalling systems, such as automatic telegraph or telephone systems. More particularly, this invention deals with a system for determining if any one circuit in a group of selectors, lines, trunks, links, etc. is unoccupied or free and available for the connection of a circuit through a switching system before the connection through the system is made, and if such a connection is possible, to reserve a circuit until said connection is completed and the connection itself then can indicate that the circuit is busy.

It is well known practice in automatic switching systems to set up backward blocking from a group of circuits or links or a group of selectors or finders, all of which are busy, in order to divert traffic from said group as long as the entire group remains busy. However, difficulties are often encountered when the last free circuits or selectors are being busied, particularly in the case of a sudden increase in traffic in the particular group of circuits or selectors. Then it may occur that more selectors or finders are started simultaneously for seizing the remaining circuits, and accordingly the excess number of selectors or finders will not be connected. Thus, if backward blocking had come into effect earlier or before all of these selectors or finders had started for the limited number of circuits, the excess calls might have been routed over another path and their through connection would have been accomplished earlier.

Furthermore, undesirable switching conditions may occur in the automatic switching system according to the Oberman co-pending United States patent application Serial No. 230,277, filed June 7, 1951, when there is innerconnecting between various groups of final selectors. In this system the busy testing selector is only stopped in the position in which the desired subscriber is obtainable in the normal way to determine the condition of a whole group, and it is therefore important to determine if at least one free final selector will be found.

Accordingly, it is an object of this invention to produce a simple, effective, efficient and economic system for reserving a detected available circuit in a group through an automatic switching system before and until the circuit is connected.

Another object of the present invention is to provide a system for limiting the number of reservations in a group or automatically reserving only a part of a given group of selectors in an automatic switching system by incoming calls for connection through said group.

Another object of this invention is to provide a system which will put backward blocking into effect earlier in an automatic switching system.

Another object is to provide a system for improving the system of the Oberman co-pending patent application Serial No. 230,277 when various groups of final selectors are interconnected.

Generally speaking, the system of this invention comprises a common conductor, means for connecting a potential corresponding to each available circuit in a group to said conductor, and means for connecting an opposing potential to said conductor corresponding to the occupation of one of said available circuits, thereby reserving a circuit in said group until said reserved circuit is occupied by disconnecting itself and its corresponding potential from said conductor.

In a group of selectors, lines, trunks, links, etc. type circuits, there is provided for each said circuit of said group a connection to a common source, or separate and preferably identical sources of voltage or potential, which potential may be connected by means of separate switch contacts corresponding to and controlled by each said circuit, to a common conductor, thereby applying a voltage to said conductor which can be measured by a testing device. When such a circuit is unoccupied, free and available for connection in a switching system, the switch contacts for that available circuit are closed so that a voltage is applied to said common conductor, and when such a circuit is occupied or busy, its switch contacts are open and no such potential is applied by that circuit to said conductor. As long as at least one of the circuits of said group is free and available, a potential is applied to said conductor which potential can be tested, and if this circuit has not already been reserved according to the system of this invention, said one potential will produce a potential level for said conductor which is above a predetermined minimum corresponding to the presence of an available circuit in said group.

In order to test for and reserve one of the circuits in such a group, means are connected to said common conductor by other switches, through which the voltage potential of the common conductor is first tested to determine if it is above the predetermined minimum, at or below which minimum there are no circuits available for reservation in that group. If the voltage of said common conductor is above said minimum, a testing device (such as a trigger device) is operated to operate a third switching means to connect an opposing potential, such as ground, to said common conductor to lower its voltage level corresponding to the occupation of one of the circuits to reserve one of the circuits in the group. The third switching means may be semi-electronic through the contact of an armature of a relay or it may be fully electronic by means of the conductivity of an electron discharge tube. In telephone or telegraph automatic switching systems having register circuits, the testing and reserving devices may constitute a part of each such register.

In order to distinguish between occupation and availability of the circuits in the sought group connected to the common conductor as well as to prevent short circuiting of the common conductor, equal ohmic resistances corresponding to each circuit may be placed in the circuits connecting the potential source or sources with the opposing potential or potentials through the common conductor, thus producing sufficient voltage increment changes to the common conductor for ready testing of availability of the circuits to which they correspond. Also, if desired, further means, such as a predetermined resistance, may be connected to said common conductor so that only part of all of the possibly available circuits in a group may be reserved.

Figure 2:
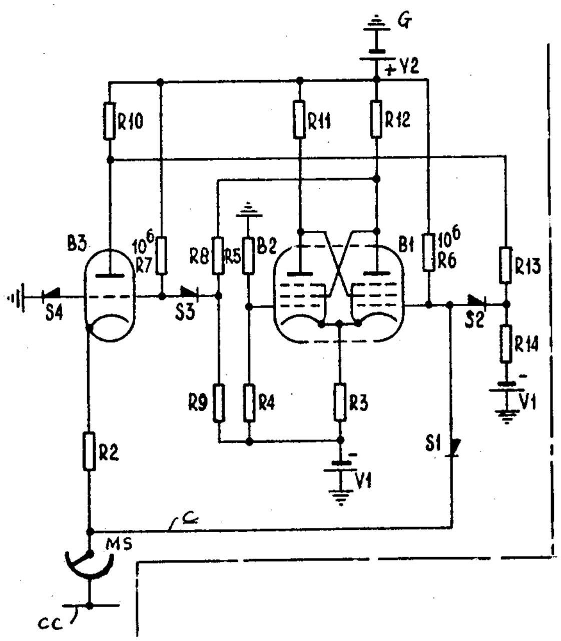

The above mentioned and other features and objects of this invention and the manner of attaining them are given more specific disclosure in the following description of embodiments of the invention taken in conjunction with the accompanying drawing, wherein:

Fig. 1 is a schematic wiring diagram of an embodiment of a semi-electronic reservation system for five circuits or selecting stages with a corresponding number of registers in an automatic switching system, showing only one of the voltage testing trigger circuits connected to one of the registers; and Fig. 2 is a schematic wiring diagram of an embodiment of a fully electronic voltage testing and reservation circuit for a register which may be employed instead of the circuit shown to the left of the heavy dot-dash center line in Fig. 1.

I. THE GROUP OF CIRCUITS

Referring to the lower right portion of the circuit shown in Fig. 1, there are schematically disclosed in separate dash-line rectangles 1, 2, 3, 4 and 5, those portions of the circuit of this invention which correspond to each of the circuits of the same group of selectors, lines, trunks, or links to which through connections may be made. Each of these portions of the circuits 1–5 are provided with corresponding separate identical voltage sources or connected to the same or a common voltage source, indicated by the batteries V, and are provided with corresponding equal ohmic resistances $R1^1$, $R1^2$, $R1^3$, $R1^4$, and $R1^5$ (or R1) and separate contacts or switches *a*1, *a*2, *a*3, *a*4 and *a*5 (or *a*), respectively. Thus, according to the specific showing there is a group of five selecting circuits or stages 1–5 which may be occupied or unoccupied and available, the presence of at least one available stage in the group which may be detected and reserved according to the system of this invention. Thus since, all of the voltage source connections indicated by the schematic showing of the batteries V are of the same potential, and all of the resistances R1 are of the same ohmic value, each voltage source connection supplies the same voltage to the common conductor CC as any other of the circuits 1–5 of that group then connected to said common conductor CC. The switch contacts *a* may be separately operated by relays (not shown) in each of the circuits 1–5, which relays are operated when said circuits are occupied, so that the contacts *a* are normally in their closed position as shown in Fig. 1 when none of the circuits 1–5 are in the busy condition. Thus, all five of the circuits 1–5 as shown in Fig. 1 are available for reservation and later occupation. However, if all five of the switch contacts *a* were open, no battery voltage V would be applied to the common conductor CC, so that any test of the conductor CC would show that all of the selecting stages 1–5 of that particular group were occupied and no circuits were free or available even for reservation.

It is desirable that the voltage source connections in each of the circuits 1–5 are connected to the negative pole of the batteries V, so that, in the case of break down of the apparatus due to the blowing of a fuse or other condition, a busy condition for the circuit will be automatically indicated by the absence of its voltage applied to the conductor CC.

II. THE SEMI-ELECTRONIC AND RESERVATION DEVICES

Referring now to the upper right-hand portion of the circuit shown in Fig. 1, there are shown another series of dash-line rectangles 1′, 2′, 3′, 4′ and 5′, preferably corresponding in number to the number of selecting stages shown, namely five, which rectangles 1′ through 5′ are parts of register circuits to which calls or connections directed through an automatic switching system are registered, until their connection is completed through the system. As part of each of these register circuits 1′–5′, there is shown other switching means for connecting said register circuits 1′–5′ in parallel to said common conductor CC, such as arcs of the separate indicator switches MS1′, MS2′, MS3′, MS4′ and MS5′, for example, the busy test selector switches of the registers.

(*a*) *The testing device*

Connected to the wipers of each of the switches MS for each register circuit 1′–5′, there are connected to conductors C1 through C5, respectively, separate testing circuits such as the trigger testing device shown at the left in Fig. 1. For the one register circuit 1′, the line C1 is connected to the control grid of tube B1, one of a pair of trigger pentode electron discharge tubes B1 and B2, while the control grid of the other tube B2 may be maintained at a voltage only slightly above or more negative than the critical predetermined voltage for which the common conductor CC would indicate that all of the selecting stages 1–5 had already been reserved or were busy, or in other words, that the number of lines already reserved equals the number of lines still available. The voltage for the control grid for the tube B2 may be maintained by means of a tap to the potentiometer comprising resistors R4 and R5 connected between a battery and ground.

The cathode voltage for the trigger tubes B1 and B2 may be connected through a resistor R3 to the negative pole of a battery so that the cathodes of the tubes B1 and B2 are more positive (or less negative) than the more positive of the two control grids of the tubes B1 and B2, or approximately at the critical voltage for the conductor CC. The anodes for the tubes B1 and B2 may be connected to the positive terminal of battery through the windings 1 and 2, respectively, of a polarized relay T1, which relay operates its corresponding contact *t*1 in the reservation device of the register circuit 1′.

Normally tube B1 is conductive when no connection of its grid is made to the common conductor CC, and accordingly winding 1 of relay T1 is energized to maintain its armature contacts *t*1 open as shown in Fig. 1. However, if at least one of the contacts *a* of circuits 1–5 is closed, the voltage through the conductor *c*1 from common conductor CC to the control grid of the tube B1 is more negative than the cathode of tube B1 and the grid of tube B2 so that the tube B1 is cut-off or becomes non-conductive, and tube B2 becomes conductive, at the moment that the wiper of the relevant busy test selector MS interconnects conductors CC and *c*1. Current flowing through tube B2 energizes the winding 2 of the polarized relay T1, which winding closes the contact *t*1 which corresponds to the fact that there is at least one circuit remaining which may be reserved, i. e. at least one circuit has its contact *a* still closed, and one is thus reserved by closing the contact *t*1 to lower or make less negative (or more positive) the potential of the common conductor CC as will be described later, by connecting it to ground through the resistor $R2^1$. However, after the last reservation possible is made and no more circuits are available, that is reservation of the fifth selecting stage according to Fig. 1, the potential of the common conductor CC drops (or becomes less negative) to its critical voltage, so that further tests of the voltage in the common conductor CC causes the tube B1 to remain or become conductive and winding 1 to be energized, which maintains the corresponding contact *t*1 open. Energization of tube B1 could cause a flip-flop or continuous change in conduction of the tubes B1 and B2, so that an oscillation between them could be set up. This oscillation, however, is prevented by an additional winding 3 of the relay T1, which is placed in series with the corresponding contacts *t* and the resistance R2, so that once that contact *t* is closed, this winding 3 holds the contact closed until the particular register is cut out, by completion of its function and the reserved selecting stage is selected and its corresponding contact *a* has been opened.

(*b*) *The reservation circuit*

Also connected to the wipers of the switches MS are connections to the opposite pole of the potential applied at the voltage sources V in the selecting stages 1—5, such as for example, grounds G, through the separate contacts *t*1, *t*2, *t*3, *t*4 or *t*5 (or *t*) which also may be connected through separate and equal reserving resistances $R2^1$, $R2^2$, $R2^3$, $R2^4$ or $R2^5$ (or R2), respectively. If a testing device, as above described, operates its corresponding switch *t* to connect the conductor CC to ground through a corresponding reserving resistance R2, the relative voltage in the conductor CC, is decreased or made less negative or more positive, by an amount to counteract the effect of one of the circuit connections to the common conductor CC by means of its contacts *a*, so that if that circuit connection *a* were the last or only connection from the group to the common conductor CC, it, or the leakage of voltage through the resistor R2 to ground, would decrease (or make less negative) the voltage level of the common conductor CC to its critical voltage level. Thus, if the number of circuit connections from circuits 1—5 is greater than the number of reservation circuit connections from circuits 1′—5′, the common conductor CC will test at a voltage level above or more negative than said critical voltage, but as soon as the number of connections *a* is equal to the number of connections *t* to the common conductor CC, the voltage level of the conductor CC will be at its critical voltage level corresponding to the fact that no more circuits are available for reservation. This, as stated above in the objects, prevents duplication, delaying, and impossible connections and enables connection registration of a circuit in a given group in an automatic switching system as soon as the desired call through the switching system has been registered by the system.

Since the values of the resistances or resistors R1 and R2 are all chosen to be equal, then the critical voltage of the common conductor CC when all the circuits were occupied or available would be half way between the voltage V of the separate sources V and the ground potential. Assuming for example, the poles of batteries V in circuits 1—5 are at −60 volts, then the critical voltage level of the common conductor CC would be −30 volts, or half battery voltage. Accordingly, the voltage applied to the grid of trigger tube B2 could be say −21 volts, and any one or more connections of circuits 1—5 without any connections to the reservation circuits 1′—5′ of the registers would produce a voltage for test in the common conductor (−60 volts) corresponding to the maximum voltage above or more negative than the critical minimum level of −30 volts. Then as each reservation circuit 1′—5′ was connected through its contact *t* to the common conductor CC, the voltage level of the common conductor CC would be correspondingly reduced (or made less negative or more positive) toward the critical level of −30 volts depending proportionally upon the number of circuits 1—5 still available. However, as the call through that stage is released as soon as a circuit or stage 1—5 which has been reserved is connected or busied and its register circuit has been released having completed its function, its corresponding contacts *a* and *t* are opened. This may cause a change in the voltage in the common conductor CC if the number of reserved circuits is not equal to the number of unoccupied circuits, but if the numbers of each of these circuits are the same then the voltage on the common conductor CC remains the same. However, in either case the voltage of the common conductor CC will not be reduced any (or made more positive).

If desired, the critical voltage level of the common conductor CC may be varied by changing the ratio of the values of the resistances R1 to the resistances R2, without departing from the scope and principle of this invention.

If it is desired to change or limit the number of reservations which may be made in a given group of selecting stages, such as in a link system to obtain a uniform engagement of groups for the same direction, an additional resistance or resistor $$\frac{1}{n}R2$$

may be connected, as shown in dotted lines in Fig. 1, to the common conductor CC, between said common conductor and the opposing potential or ground. The value of this resistance $$\frac{1}{n}R2$$

accordingly may be chosen so that reservations will be made as long as there are *n* more than number of circuits still free and available in that group. For example, if the particular circuit of Fig. 1 is to be limited only to one reserving possibility, then the resistor $$\frac{1}{n}R2$$

may be placed at the value of ¼R2 where $n=4$, so that as long as none of the selecting stages 1—5 have been reserved or occupied, the test of the voltage in conductor CC will operate the trigger circuit to close a contact *t* to reserve one of the circuits 1—5, after which the group of circuits 1—5 will be indicated to be busy until all five of the circuits of that group are again free and available. Then as the traffic grows the value of *n* may be decreased to meet the demands of the situation.

III. THE FULLY ELECTRONIC TESTING AND RESERVING CIRCUITS

According to the circuits shown in Fig. 1, there is a slight delay in the reservation due to the time it takes to operate or close a contact *t*. This may be eliminated by replacing the portion of the circuit shown in Fig. 1 to the left of the heavy dot-dash line by a circuit similar to that shown in Fig. 2.

In the circuit shown in Fig. 2, the trigger tubes B1 and B2 are also shown and operate the same as those in Fig. 1 described above. The wiper of the indicator switch MS in the register circuit, however, is not directly connected to the control grid of the tube B1 but instead is connected to a rectifier S1 in the conductor *c*, which grid is also connected through a high resistance R6, say of about $10^6$ ohms, to the positive pole of the battery or voltage source V2. Although the cathode of the trigger tubes B1 and B2 are connected in series through resistance R3 to the negative pole of a voltage source V1 as in Fig. 1, the anodes of the trigger tubes B1 and B2 are not connected through the windings of a relay but through anode resistors R12 and R11, respectively, to a positive voltage source V2. The anode of B1, however, is also connected to one end of a potentiometer comprising resistors R8 and R9, between which resistors in a connection through a rectifier S3 to a control grid of a third and control tube B3. This control grid of tube B3, however, also is connected to the positive voltage source through high resistance R7, similar to resistance R6 mentioned above to the grid of tube B1. The cathode of this third control tube B3 is connected through the resistance R2 corresponding to one of the resistances $R2^1$—$R2^5$ shown in Fig. 1, which is connected to the wiper of the indicator switch MS. Furthermore, the control grid of the tube B3 is connected to ground through another rectifier S4, and the anode of the tube B3 is connected both through an anode resistance R10 to the positive potential as well as to the end of another potentiometer comprising resistors R13 and R14, from which there is a tap through another rectifier S2 to the control grid of the tube B1. Thus, the tube B3 takes the place of the contact *t* and extra winding 3 of the relay T of the circuit in Fig. 1.

If the common reservation conductor CC is at its critical voltage level, corresponding to no available circuits or stages 1—5, the trigger tube B1 will become conductive and not trigger tube B2. In that case, the anode of the tube B1 has a lower or more negative voltage which keeps the control grid of the control tube B3, through means of the potentiometer R8 and R9, at a voltage which is more negative than that of its cathode connected to the common conductor CC through the resistance R2 and selector switch MS. Consequently, the tube B3 remains non-conductive which is equivalent to the open condition of the switch *t* in Fig. 1. The rectifiers S3 and S4 are so connected to the grid of the tube B3 that its control grid always follows the more negative voltage applied to the two rectifiers S3 and S4.

If the potential of the common reservation conductor CC is more negative than its critical voltage level, corresponding to at least one available circuit 1—5, tube B1 will then become non-conductive, since its control grid becomes more negative than its cathode and the tube B2 will become conductive. In this case the voltage passed by the tube B1 to the rectifier S3 via potentiometers R8—R9 will be more positive than ground potential and tube B3 will then become conductive so that the cathode potential of tube B3 is practically shifted to the ground potential due to the fact that the rectifier S4 connected to the control grid of the tube B3 is practically at ground potential. As a result of the voltage drop in the resistor R10 in the anode circuit of the tube R3, the anode voltage of the tube B3 decreases (or becomes more negative) so that a negative voltage is applied to and maintained at the control grid of the tube B1 via the potentiometer R13—R14 and rectifier S2 to keep the tube B1 cut off. This connection between the anode of tube B3 and grid of tube B1 prevents the trigger tubes B1 and B2 from oscillating until after the function of the reservation device has been completed, and corresponds in function to the holding winding 3 of the relay T in Fig. 1.

Thus, as long as the voltage in the conductor CC either in the circuits according to Fig. 1 or Fig. 2 is greater than or more negative than the predetermined critical voltage level, the group testing device of this invention will function so that an opposing or the ground potential will be applied to the conductor CC through a resistance R2, which will reduce (or make less negative or more positive) the voltage on the common conductor CC proportionally to the number of circuits 1—5 yet unoccupied and available and pending the opening of one of the contacts *a* of the selecting stages 1—5, thereby reserving one of the selecting stages until said contacts *a* may be opened and a definite occupation or busying condition for one of the circuits may be established. An application of such a reserving circuit to an automatic telephone switching system is disclosed in Fig. 9 of Oberman's co-pending U. S. patent application Serial No. 300,806, filed July 25, 1952, claiming priority from the Dutch application No. 161,343, dated May 19, 1951.

One of the systems in which the circuit of this invention may be advantageously employed is that of an automatic telephone system having an exchange controlled by register circuits. In such a system a calling subscriber's line is first connected to a register circuit which register then sets up the connection to the called subscriber's line through the free finders, selectors and link circuits in the exchange. The register thus seeks for mutually free link circuits for interconnecting the calling and called subscriber. As soon as such circuits are found they are reserved by the circuit according to this invention until they are actually seized or busied by the completion of the calling connection. This seizure of a reserved link circuit is accomplished when the relay A (not shown here) in the register is operated to open its contact *a* which remains open as long as the calling connection between the calling and called subscriber exits. By reserving such a free link before it is seized, another register in the meantime cannot also detect its unbusied condition and start to set up another calling connection to it only to find that it is occupied by the time it gets there. Thus according to the system of this invention when a free and mutually available link circuit has been found by the operation of the busy test selector MS, the relay T is operated (which may be a part of the register circuit) to reserve said found free link, and if it is the only mutually available and free link of the group it will also automatically busy said free link for all subsequent link searching registers until after it has been released.

Accordingly, the circuit of this invention permits connection to be made more directly through an automatic switching system and also detect backward blocking at an earlier stage in the through switching operation so that the calls through an exchange will be more evenly distributed over all of the multiple circuits and switches, particularly during the times of heavy traffic. Also, the circuit of this invention is adapted for limiting the number of busy and reserved links which exist for any one group of circuits, in order to further distribute the calls over all of the groups of the exchange.

While there is described above the principles of this invention in connection with specific apparatus, it is to be clearly understood that this description is made only by way of example and not as a limitation to the scope of this invention.

What is claimed is:

1. A system for reserving circuits in a group of circuits in an automatic switching system, comprising: a common conductor, separate means for connecting a given potential to said conductor corresponding to each unoccupied circuit in said group, means for testing the potential of said conductor and responding to a potential greater than predetermined minimum potential level, means for connecting said testing means to said common conductor, and means controlled by the response of said testing means for connecting and opposing potential to said conductor to decrease the potential of said conductor toward said minimum level proportionally to the number of said circuits remaining unoccupied, thereby reserving a circuit of said group connected to said conductor until said circuit can be occupied.

2. A system according to claim 1 including means connected to said common conductor for limiting the number of circuits in a group which can be reserved.

3. A system according to claim 1 wherein said means for connecting said opposing potential to said common conductor comprises a relay operated by said testing means, and a contact switch between said common conductor and said opposing potential that is operated by said relay.

4. A system according to claim 3 wherein said relay includes a holding winding in series with said switch between said opposing potential and said common conductor.

5. A system according to claim 1 wherein said means for connecting said opposing potential to said common conductor comprises an electron discharge device connected between said opposing potential and said common conductor.

6. A system according to claim 1 wherein said means for connecting said given potential to said conductor includes separate switches and separate resistances corresponding to each of said circuits of said group.

7. A system according to claim 6 wherein said separate resistances are each of the same ohmic value.

8. A system according to claim 1 wherein said means for connecting the opposing potential to said common conductor includes a resistance between said opposing potential source and said common conductor.

9. A system according to claim 1 wherein the number of said means for connecting the opposing potential to said common conductor corresponds in number to the number of circuits available in said group.

10. A system for reserving circuits in a group of circuits in an automatic switching system, comprising: a common conductor connected to each circuit which may be reserved in said group of circuits, separate means for connecting a given potential in parallel to said conductor corresponding in number to the number of said circuits available for reservation, means for testing the voltage of said common conductor to determine if circuits are available for reservation, and separate means for connecting in parallel an opposing potential to said common conductor to decrease the voltage of said conductor corresponding to the number of circuits in said group reserved.

11. A system for reserving circuits in an automatic switching system, comprising: a group of circuits which may be occupied, each of which circuits has a given first voltage source, a common conductor to all of said circuits, separate first switching means to connect said first voltage source to said common conductor when said circuit is unoccupied, to apply said voltage to a conductor, a second switching means for connection of a circuit of said group to said conductor, a voltage testing device connected to said common conductor through said second switching means and responsive to greater than a given voltage level on said common conductor, a second voltage source opposing said first voltage source, and means responsive to the operation of said testing device to connect said second voltage source to said common conductor through said second switching means to decrease the voltage level of said common conductor proportionally to the number of circuits remaining unoccupied, thereby reserving one of said circuits in said group until said call connection to the reserved circuit is completed and said circuit is occupied.

12. A testing and reserving arrangement for automatic switching systems containing a plurality of circuits in a group which may be selected, said arrangement comprising: a common conductor, a plurality of normally closed contacts corresponding to each said circuit connected in parallel to said common conductor, a voltage source, a resistance connected in series with each of said contacts to said voltage source, a plurality of selecting switches connected in parallel to said common conductor, a voltage testing device and a reservation device connected in parallel with each of said selecting switches; each said reservation device comprising: a counteracting voltage source, a second resistance, and a second contact operated by the corresponding one of said testing devices to connect said common conductor through said second resistance to said counteracting voltage source, whereby the resulting voltage in said common conductor causes the operation of said testing device to operate said reservation device when said voltage is above a predetermined potential level corresponding to at least one available circuit in said group.

13. An arrangement according to claim 12 wherein all said resistances are equal valued resistors.

14. An arrangement according to claim 12 wherein said opposing voltage source is at ground potential.

15. In an automatic signalling system for controlling the connection of a circuit through said system and a plurality of circuits multiplied in a group for producing a given connection, a system for reserving an available one of said circuits before said circuit is connected, comprising: a potential source having opposing poles, one pole being associated with each one of said circuits of said group, a first resistance connected to one pole of said source, a common conductor, separate first switching means for connecting said one pole through each of said first resistances to said common conductor, second switching means for connection to said common conductor, testing devices connected to each said second switching means, means connected to each said second switching means and operated by its corresponding testing device when the voltage of said common conductor is above a certain predetermined value for connecting said conductor through the corresponding one of said second switching means to the other pole of said potential source, whereby the voltage of said common conductor is reduced an amount corresponding to the number of said circuits in said group still available and unoccupied that are connected to said common conductor through its said first switching means, and means for maintaining said other pole connected to said common conductor until one of said circuits is occupied and its voltage disconnected from said conductor by opening of its corresponding said first switching means.

References Cited in the file of this patent

UNITED STATES PATENTS

| | | |
|---|---|---|
| 2,088,318 | Busch | July 27, 1937 |
| 2,291,036 | Hall | July 28, 1942 |
| 2,338,642 | Holden | Jan. 4, 1944 |
| 2,454,781 | Deakin | Nov. 30, 1948 |
| 2,529,166 | Lesigne | Nov. 7, 1950 |